United States Patent [19]

Ogawa et al.

[11] Patent Number: 5,733,352
[45] Date of Patent: Mar. 31, 1998

[54] HONEYCOMB STRUCTURE, PROCESS FOR ITS PRODUCTION, ITS USE AND HEATING APPARATUS

[75] Inventors: Mitsushige Ogawa; Yasuo Imamura, both of Omuta, Japan

[73] Assignee: Denki Kagaku Kogyo Kabushiki Kaisha, Tokyo, Japan

[21] Appl. No.: 696,190

[22] Filed: Aug. 13, 1996

[30] Foreign Application Priority Data

Aug. 22, 1995 [JP] Japan ................... 7-213537

[51] Int. Cl.$^6$ .................. B01D 39/20; C04B 38/00
[52] U.S. Cl. .................. 55/523; 55/DIG. 30; 428/116; 60/311
[58] Field of Search .................. 428/116, 593, 428/188; 55/523, DIG. 30; 60/311

[56] References Cited

U.S. PATENT DOCUMENTS

| | | |
|---|---|---|
| Re. 31,405 | 10/1983 | Paisley . |
| 4,293,357 | 10/1981 | Higuchi . |
| 4,297,140 | 10/1981 | Paisley . |
| 4,300,953 | 11/1981 | Lachman . |
| 4,329,162 | 5/1982 | Pitcher . |
| 4,439,929 | 4/1984 | Kitagawa et al. . |
| 4,557,773 | 12/1985 | Bonzo . |
| 4,573,896 | 3/1986 | Bonzo . |
| 4,965,101 | 10/1990 | Frei et al. . |
| 5,234,659 | 8/1993 | Moen . |
| 5,458,664 | 10/1995 | Ishii et al. ............ 55/DIG. 30 |
| 5,545,243 | 8/1996 | Kotani et al. ............ 55/523 |
| 5,634,952 | 6/1997 | Kasai et al. ............ 55/523 |

FOREIGN PATENT DOCUMENTS

| | | |
|---|---|---|
| 0 658 363 | 6/1995 | European Pat. Off. . |
| 195 22 312 | 1/1996 | Germany . |
| 55-119414 | 9/1980 | Japan ............ 55/523 |
| 57-7215 | 1/1982 | Japan . |
| 58-37480 | 3/1983 | Japan . |
| 58-174216 | 10/1983 | Japan ............ 55/523 |
| 61-83689 | 4/1986 | Japan . |
| 5-77442 | 10/1993 | Japan . |
| 9-19613 | 9/1997 | Japan . |

OTHER PUBLICATIONS

Patent Abstracts of Japan, vol. 016, No. 054 (C–0909), Feb. 12, 1992, JP–A–03 253600, Nov. 12, 1991.

Database WPI, Derwent Publications, AN 93–410207, JP–A–05 309 220, Nov. 22, 1993.

Database WPI, Derwent Publications, AN 88–052593, JP–A–63 007 814, Jan. 13, 1988.

*Primary Examiner*—C. Scott Bushey
*Attorney, Agent, or Firm*—Oblon, Spivak, McClelland, Maier & Neustadt, P.C.

[57] ABSTRACT

A honeycomb structure having a porous cell wall, wherein the surface roughness of the cell wall is at least 30 μm. The open pore diameter at the cell wall surface is at least 10 μm and the porosity of the cell wall is at least 40%. The honeycomb structure is made of alumina, cordierite, mullite, silicon nitride or aluminum nitride. In the alternative, the honeycomb structure may be made of silicon carbide. The honeycomb structure is used to form a diesel particulate filter.

10 Claims, 1 Drawing Sheet

FIGURE 1

HONEYCOMB STRUCTURE, PROCESS FOR ITS PRODUCTION, ITS USE AND HEATING APPARATUS

BACKGROUND OF THE INVENTION

1. Field of the Invention

The present invention relates to a honeycomb structure, a process for its production, a diesel particulate filter consisting of a silicon carbide honeycomb structure, and a heating apparatus useful for the production of the honeycomb structure.

2. Discussion of the Background

A honeycomb structure made mainly of cordierite or silicon carbide has been proposed as a filter for collecting from an exhaust gas combustible fine particles such as soot which is considered to be a hazardous substance, such as a diesel particulate filter (hereinafter referred to as "DPF") for collecting combustible fine particles contained in an exhaust gas from a diesel engine. It is a porous ceramic structure having a number of through-holes extending from the inlet end face to the outlet end face, wherein the number of through-holes are partitioned by a porous wall, i.e. a so-called a cell wall, and the number of through-holes are alternately sealed in a checkered pattern at the inlet end face and the outlet end face, so that the through-holes sealed at the inlet end face are open at the outlet end face, and the through-holes which are open at the inlet end face, are sealed at the outlet end face. Such DPF is mounted as a part of an exhaust gas system for a diesel engine, so that an exhaust gas will flow into the through-holes which are open at the inlet end face, and when it passes through the cell wall, combustible fine particles are collected, whereupon the exhaust gas freed from the combustible fine particles will flow out from the through-holes which are open at the outlet end face. Accordingly, the cell wall is required to have a porosity and a pore diameter suitable for collecting all or substantially all combustible fine particles while permitting the exhaust gas containing combustible fine particles to readily pass therethrough.

When a certain predetermined amount of combustible fine particles are collected by the cell wall of DPF, the cell wall becomes clogged, and the permeation resistance tends to increase. Accordingly, it is necessary to periodically remove the particles to regenerate DPF. Especially, an exhaust gas from a diesel engine or the like contains a large amount of combustible fine particles. Accordingly, it is common to employ DPF of a large size, and the regeneration interval is also adjusted to some extent.

As a method for regeneration of DPF, there may be mentioned, for example, a method wherein a combustion gas of a burner is directly jetted to burn off the combustible fine particles, a method wherein DPF is combined with a heating metal layer such as a nichrome wire heater for heating and incineration, or a method wherein an electric current is directly applied to DPF made of an electrically conductive material for self heat-generation to burn off the combustible fine particles. However, if such regeneration is frequently repeated, DPF undergoes thermal fatigue, whereby the mechanical strength decreases, and particularly with large size DPF, the temperature gradient increases by combustion, whereby cracking due to thermal stress is likely to result, and local heat generation is likely to occur due to uneven collection of the combustible fine particles, whereby cracking or fusing loss is likely to result.

Heretofore, as an invention from the viewpoint of the pore characteristics of a cell wall and collection and incineration of combustible fine particles, Japanese Examined Patent Publication No. 77442/1993 (U.S. Pat. No. 4,297,140) discloses DPF wherein, in a cell wall of a honeycomb structure, the volume of open porosity and the mean diameter of pores constituting the open porosity, are within a zone defined by boundary lines connecting coordinate points 1-G-5-2-3-4 (wherein point 1: open porosity 58.5%, mean diameter of pores 1 µm, point G: open porosity 46.8%, mean diameter of pores 12 µm, point 5: open porosity 39.5%, mean diameter of pores 15 µm, point 2: open porosity 33.0%, mean diameter of pores 15 µm, point 3: open porosity 52.5%, mean diameter of pores 20 µm, point 4: open porosity 90.0%, mean diameter of pores 1 µm).

Further, Japanese Unexamined Patent Publication No. 83689/1986 discloses a silicon carbide honeycomb structure wherein a number of through-holes are adjacent to one another in an axial direction as partitioned by a thin wall, wherein the partition wall is of a three dimensional network structure composed mainly of plate-like crystals having an average aspect ratio of from 2 to 50.

Furthermore, many prior art references are available with respect to a method for sealing the end faces of a honeycomb structure. For example, Japanese Unexamined Patent Publication No. 7215/1982 (U.S. Pat. No. 4,293,357) and Japanese Unexamined Patent Publication No. 37480/1983 (U.S. Pat. No. 4,557,773 and No. 4,573,896) disclose a method wherein a film or the like is bonded to an end face of honeycomb, and then holes are formed at positions corresponding to the through-holes to be sealed, or a film having such holes preliminarily provided, is bonded to an end face of honeycomb, and then such holes will be sealed by a sealing material at an end face of honeycomb.

However, such prior art references disclose nothing about the size of the opening portions of pores formed in the cell wall (i.e. the open pore diameter at the cell wall surface), or the effects for collection of combustible fine particles by the surface roughness of the cell wall and the open pore diameter at the cell wall surface. Accordingly, conventional DPF provides no adequate effects for collecting combustible fine particles and is susceptible to clogging, whereby it has been difficult to reduce the size of DPF.

It is an object of the present invention to provide a honeycomb structure, whereby the effects for collecting combustion fine particles can be increased by controlling the surface characteristics of the cell wall.

Another object of the present invention is to provide a method for producing a uniform honeycomb structure excellent in such effects for collecting combustible fine particles at high productivity without causing cracking or fusing loss.

Still another object of the present invention is to provide high performance DPF by using silicon carbide as the material for DPF and by increasing the effects for collecting combustible fine particles by controlling the surface characteristics of the cell wall, so that it is possible to reduce the size of DPF and to shorten the regeneration cycle.

A further object of the present invention is to provide a process for producing an electrically conductive sintered body and a heating apparatus, whereby the electrically conductive molded product can be sintered with a uniform temperature distribution and under a stabilized condition even when heating is conducted at a high temperature rising condition.

Namely, the present invention provides:

1. A honeycomb structure having a porous cell wall, wherein the surface roughness of the cell wall is at least 30 µm.
2. The honeycomb structure according to Item 1, wherein the open pore diameter at the cell wall surface is at least 20 µm.
3. The honeycomb structure according to Item 2, wherein the mean diameter of pores in the cell wall is from 10 to 40 µm, and the porosity of the cell wall is at least 40%.

4. The honeycomb structure according to Item 1, 2 or 3, wherein the honeycomb structure is made of alumina, cordierite, mullite, silicon nitride or aluminum nitride.

5. The honeycomb structure according to Item 1, 2 or 3, wherein the honeycomb structure is made of silicon carbide.

6. A diesel particulated filter consisting essentially of the honeycomb structure as defined in Item 5.

7. A process for producing a honeycomb structure, which comprises molding an electrically conductive material into a honeycomb shape molded product, and heating and sintering it in a non-oxidizing atmosphere by conducting an electric current in the axial direction of honeycomb through-holes.

8. The process for producing a honeycomb structure according to Item 7, wherein the honeycomb shape molded product is also externally heated from its side by a side heater.

9. The process for producing a honeycomb structure according to Item 8, wherein heating and sintering are carried out so that the temperature difference between the outer surface of the honeycomb shape molded product and the side heater is within ±10%.

10. The process for producing a honeycomb structure according to Item 7, 8 or 9, wherein the honeycomb shape molded product is made of alumina, cordierite, mullite, silicon nitride or aluminum nitride.

11. The process for producing a honeycomb structure according to Item 7, 8 or 9, wherein the honeycomb shape molded product is made of silicon carbide.

12. The process for producing a honeycomb structure according to Item 7, 8 or 9, wherein the honeycomb shape molded product is composed of from 20 to 80 wt% of a silicon carbide powder, the remainder being substantially a silicon nitride powder and a carbonaceous material, wherein the molar ratio of the silicon content in the silicon nitride powder to the carbon content in the carbonaceous material (Si/C) is from 0.5 to 1.5, and such a molded product is calcined at a temperature of at least 1,600° C.

13. The process for producing a honeycomb structure according to Item 7, 8 or 9, wherein the honeycomb shape molded product is composed of from 20 to 80 wt% of a silicon carbide powder, the remainder being substantially a silicon nitride powder, a silicon oxide powder and a carbonaceous material, wherein the silicon oxide powder has a mean particle diameter of at most 1 μm and its proportion is from 5 to 30 parts by weight per 100 parts by weight of the silicon nitride powder, and the proportion of the carbonaceous material is such that the molar ratio of the total silicon content in the silicon nitride powder and the silicon oxide powder to the carbon content in the carbonaceous material (Si/C) is from 0.5 to 1.5, and such a molded product is calcined at a temperature of at least 1,600° C.

14. The process for producing a honeycomb structure according to Item 13, wherein the honeycomb shape molded product is externally heated at a temperature of at least 1,600° C. for sintering, without carrying out the electrical heating.

15. A heating apparatus comprising a heat treatment chamber (1), and disposed therein, a pair of electrodes (3) and (4) to conduct an electric current to an article (2) to be treated and a side heater (10) to externally heat the article to be treated from its side surface, wherein the pair of electrodes and the side heater are connected to the respective power supply control apparatus.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
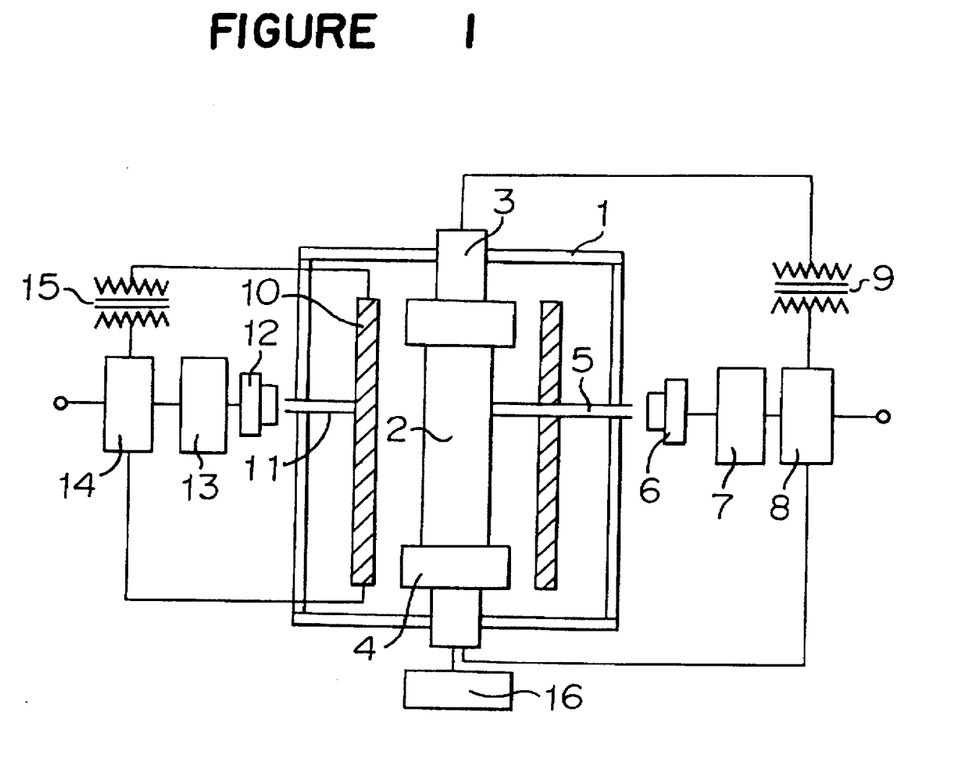
FIG. 1 is a schematic view of the heating apparatus of the present invention.

Referring to FIG. 1, disposed in a heat treatment chamber (1) are a pair of electrodes i.e. the upper and lower electrodes (3) and (4) to conduct an electric current directly to an article (2) to be treated and a side heater (10) to externally heat the article to be treated, from the side surface thereof, wherein the pair of electrodes and the side heater are connected to the respective power supply control apparatus (5) to (9) and (11) to (15), and the lower electrode is movable up and down by an electrode moving apparatus (16).

The honeycomb structure of the present invention may be made of such a material as a metal such as Al, Cr or Ni, ceramics such as silicon carbide, aluminum nitride, silicon nitride, alumina, cordierite or mullite, or a thermet such as $Al_2O_3/Fe$, $Al_2O_3/Ni$ or $B_4C/Fe$. Among them, silicon carbide is particularly suitable, since it has excellent heat resistance, and its porous body has a structure such that pores are formed at spaces among crystal particles which are entangled in a complicated state, whereby a gas permeation resistance is small, and the efficiency for collecting combustible fine particles is high.

In the honeycomb structure of the present invention, the surface roughness of the cell wall is specified to be at least 30 μm, preferably from 40 to 300 μm since the surface roughness of the cell wall is closely related to the collectable amount of combustible fine particles. If the surface roughness is less than 30 μm, the collectable amount of combustible fine particles can not be increased. There is no particular limitation to the upper limit of the surface roughness of the cell wall. However, the upper limit is preferably 300 μm, taking the strength into consideration.

In the present invention, it is preferred that the size of pores formed in the cell wall is controlled, even with a honeycomb structure having the above surface roughness. Namely, in the present invention, the open pore diameter at the cell wall surface i.e. the size of pores at their openings, is preferably at least 20 μm, more preferably from 20 to 50 μm. If this open pore diameter at the cell wall surface is less than 20 μm, clogging is likely to take place with a slight deposition of combustible fine particles, since the combustible fine particles have a strong adhesive force as they are formed by agglomeration of e.g. an oil component of a diesel engine. There is no particular restriction as to the upper limit of the open pore diameter at the cell wall surface. However, the upper limit is preferably 50 μm, taking the strength into consideration.

In the present invention, the open pore diameter at the cell wall surface is meant for a mean diameter obtained by an image analysis upon observation of the cell wall surface by a scanning electron microscope. The measuring method will be described in detail in the following Examples.

For the honeycomb structure of the present invention, there is no particular restriction as to the mean pore diameter of pores formed in the cell wall, or the porosity. However, the porosity of the cell wall is preferably at least 40%, more preferably from 50 to 70%, and the mean pore diameter is preferably from 10 to 40 μm. If the porosity of the cell wall is less than 40%, the gas permeation resistance tends to be high, and if it exceeds 70%, the strength will decrease. Further, if a mean diameter of pores in the cell wall is less than 10 μm, combustible fine particles tend to clog in the interior of the cell wall, and if it exceeds 40 μm, the strength tends to be low.

In the present invention, the mean diameter of pores in the cell wall is meant for the one obtained by a mercury injection method. The measuring method will be described in detail in the following Examples.

With respect to the applications of the honeycomb structure of the present invention, in the case of an electrically conductive honeycomb structure, in addition to DPF, a duct heater, a hot air-generating heater for a large sized dryer and various heaters for e.g. air conditioners, cooking devices, drying instruments and incineration furnaces, may be mentioned. Further, the honeycomb structure of the present invention may be used as a carrier for a catalyst for cleaning an exhaust gas.

DPF consisting essentially of a silicon carbide honeycomb structure of the present invention has merits such that the collectable amount of combustible fine particles increases, and incineration of the collected combustible fine particles is facilitated, whereby cracking or fusing loss can be remarkably reduced. DPF of the present invention may be produced by sealing the honeycomb through-holes of the honeycomb structure of the present invention at its both end faces. Such sealing can be carried out by methods disclosed in the above-mentioned prior art references or by the method disclosed in Japanese Patent Application No. 171080/1995 by the present applicants.

Now, the process for producing a honeycomb structure according to the present invention will be described.

The process for producing a honeycomb structure according to the present invention is characterized in that a honeycomb shape molded product is formed of an electrically conductive material, and it is heated and sintered in a non-oxidizing atmosphere by conducting an electric current in the axial direction of the honeycomb through-holes. By carrying out sintering by conducting an electric current as in the present invention, sintering can be accomplished in a short period of time as compared with a method wherein sintering is carried out by external heating. Besides, the cell wall undergoes self heat generation by conducting an electric current in the axial direction of the honeycomb throughholes, whereby crystal particles in the vicinity of the surface which have a larger free energy, can be preferentially sintered, and the surface roughness of the cell wall can be increased by the grain growth at that time. With respect to the atmosphere during the sintering, it is necessary to carry out the sintering in a non-oxidizing atmosphere such as nitrogen or argon so that the electrical conductivity of the conductive material will not be lost by oxidation.

The honeycomb shape molded product having an electrical conductivity, to be used in the present invention, preferably has a resistance of at most 100 Ω, more preferably from $10^{-1}$ to $10^{-2}$ Ω, at room temperature. By employing such a molded product, heat generation and sintering can be carried out at a low voltage at a level of a few V to 50 V. The material for the honeycomb shape molded product may, for example, be electrically conductive ceramics such as titanium carbide, titanium nitride, titanium boride or molybdenum silicate, or its precursor such as a powder mixture of a metal titanium powder and carbon. Further, non-conductive ceramics may also be used, and in such a case, an addition of a conductivity-imparting agent will be required to carry out sintering by conducting an electric current, and for such a purpose, a carbonaceous material is preferred. The carbonaceous material can readily be removed by heat treatment in an oxidizing atmosphere after sintering. Further, by adjusting the amount and the particle size thereof, it is possible to control the porosity, the pore diameter and the surface roughness of the honeycomb structure. Such non-conductive ceramics may, for example, be oxide type ceramics such as alumina, cordierite or mullite, or non-oxide ceramics such as silicon nitride, aluminum nitride or silicon carbide.

Among the above-mentioned materials for the honeycomb shape molded product, silicon carbide is most suitable for DPF. Accordingly, the process for producing a silicon carbide honeycomb structure will be described in detail in the following.

The silicon carbide honeycomb structure of the present invention can be prepared by molding a mixture comprising predetermined amounts of a silicon carbide powder, a silicon nitride powder and a carbonaceous material into a honeycomb shape molded product, which is then reaction-sintered. Merits in using such a honeycomb shape molded product, are such that sintering can be carried out by conducting an electric current, since the molded product has a suitable electrical conductivity such that the resistance at room temperature is at most 100 Ω, preferably from $10^{-1}$ to $10^2$ Ω, and it is possible to control the porosity and the pore diameter of the honeycomb structure by adjusting the amount and the particle size of the silicon carbide powder. Further, the surface roughness can be increased by controlling the growth of the crystal particles during the reaction sintering. With such merits, it is possible to produce DPF of high strength, which has good effects for collecting combustible fine particles.

The mean particle diameter of the silicon carbide powder to be used in the present invention is preferably at most 50 μm, more preferably from 10 to 50 μm. If the mean particle diameter is less than 10 μm, the mean diameter of pores in the cell wall tends to be small, and if it exceeds 50 μm, the strength tends to be low. Further, the particle diameter of the silicon nitride powder is preferably at most 100 μm, more preferably at most 50 μm, from the viewpoint of the moldability and the carbonization reactivity. As the carbonaceous material, free carbon such as carbon black, acetylene black or graphite, or an organic resin which becomes carbon upon pyrolysis, such as phenol, furan or polyimide, may, for example, be used. The mean particle diameter of free carbon is preferably at most 10 μm, more preferably at most 1 μm.

The proportions of the respective components in the mixture comprising the silicon carbide powder, the silicon nitride powder and the carbonaceous material are such that the silicon carbide powder is from 20 to 80 wt%, and the rest of from 80 to 20 wt% is substantially the silicon nitride powder and the carbonaceous material. Further, with respect to the proportions of the silicon nitride powder and the carbonaceous material, the molar ratio of the silicon content in the silicon nitride powder to the carbon content in the carbonaceous material (Si/C) is preferably from 0.5 to 1.5. The silicon carbide powder serves as aggregates in the reaction sintering. If it is less than 20 wt%, the strength tends to be low, and if it exceeds 80 wt%, the electrical resistance of the honeycomb shape molded product tends to be high, whereby the electrical sintering tends to be difficult, and the open pore diameter at the cell wall surface tends to be small. On the other hand, if the Si/C molar ratio is less than 0.5, the grain growth of silicon carbide formed by carbonization tends to be hindered by the remaining carbon, whereby the mean diameter of pores in the cell wall tends to be small. Whereas, if the Si/C molar ratio is larger than 1.5, the unreacted silicon content formed by the decomposition of silicon nitride tends to be large, whereby the strength tends to be low, and when heating is carried out at a high temperature raising rate, the unreacted silicon content is likely to melt and soften, thus leading to sinter-cracking.

Further, in the present invention, it is preferred that in the above mixture, a part of the silicon nitride powder is substituted by a silicon oxide powder, whereby it will be easy to increase the open pore diameter at the cell wall surface to a level of at least 20 μm. Further, it will be possible to produce a honeycomb structure having excellent effects for collecting combustible fine particles simply by carrying out external heating and sintering without carrying out the electrical heating and sintering.

Here, the proportion of the silicon oxide powder is preferably from 5 to 30 parts by weight, per 100 parts by weight of the silicon nitride powder. If the amount is less than 5 parts by weight, it tends to be difficult to increase the open pore diameter at the cell wall surface to a level of at least 20 μm. On the other hand, if it exceeds 30 parts by weight, the porosity of the cell wall tends to be too high, whereby the strength tends to be low, and in sintering under a high temperature rising rate, a large amount of CO gas will form suddenly by the reaction with the carbonaceous material, whereby sinter-cracking is likely to occur.

Further, the mean particle size of the silicon oxide powder is preferably at most 1 μm, whereby the effects for increasing the open pore diameter at the cell wall surface will be promoted. Namely, in the present invention, a binder and water are incorporated to the above mixture to obtain a kneaded product, which will then be extruded under high pressure from a die to form a honeycomb shape molded product. In such an operation, the kneaded product passing through the die surface has such a nature that a fine powder having a high fluidity tends to segregate even when it is attempted to reduce the friction with the die. In the present invention, this nature is utilized in such a manner that the silicon oxide powder having a mean particle size of at most 1 μm is segregated in the vicinity of the cell wall surface, and at the time of sintering, such a segregated silicon oxide powder is preferentially reacted with the carbonaceous material to generate CO gas, whereby the open pore diameter at the cell wall surface can be increased.

In the embodiment of the present invention wherein a mixture having a part of the silicon nitride powder substituted by a silicon oxide powder, is used, the proportion of the carbonaceous material is preferably such that the molar ratio of the total silicon content in the silicon nitride powder and the silicon oxide powder to the carbon content in the carbonaceous material (Si/C) is from 0.5 to 1.5. For the preparation of the mixture, any method may be employed so long as it is a method which is capable of uniformly mixing the mixture, such as dry or wet system mixing. For the extrusion molding of the mixture, suitable amounts of water and an organic binder such as methyl cellulose or polyvinyl alcohol, are incorporated to the mixture to obtain a kneaded product.

Then, the kneaded product is extrusion-molded into a honeycomb molded product of a desired shape and then heated and sintered. The heating and sintering is carried out in a non-oxidizing atmosphere such as nitrogen or argon by directly conducting an electric current in the axial direction of honeycomb through-holes. However, in a case where a mixture having a part of the silicon nitride powder substituted by a silicon oxide powder, is used, such electrical heating is desirable but not necessarily required, and sintering can be carried out by conventional external heating.

The electrical heating is carried out after both end faces of the honeycomb shape molded product are pressed against a pair of electrodes made of e.g. carbon, silicon carbide, molybdenum silicate or metal under a face pressure of from 20 to 500 g/cm². In such a case, in order to reduce the contact resistance at the contact surface between the honeycomb shape molded product and the electrodes, it is preferred to interpose a fiber or powder having a low reactivity with the honeycomb shape molded product. Further, in order to suppress dissipation of heat from the honeycomb shape molded product during the electrical heating and sintering, it is preferred to insulate the side surface of the honeycomb shape molded product with e.g. a graphite board which has large heat-shielding effects and excellent heat reflection properties.

The sintering temperature is preferably at least 1600° C., more preferably from 1800 to 2500° C. If the sintering temperature is lower than 1600° C., unreacted silicon nitride and carbonaceous material will remain, whereby the heat resistance tends to be low, and the grain growth of silicon carbide tends to be inadequate, whereby the surface roughness of the cell wall or the open pore diameter at the cell wall surface tend to be inadequate. On the other hand, if the sintering temperature exceeds 2500° C., crystal transformation or melting is likely to result, or the strength tends to be low due to extreme grain growth.

In the present invention, it is preferred to conduct external heating by a side heater from the side surface of the honeycomb shape molded product, together with the above-mentioned electrical heating, at the time of heating and sintering the honeycomb shape molded product, as shown in FIG. 1. The external heating is preferably carried out so that the temperature difference between the outer surface of the honeycomb shape molded product and the side heater will be within ±10%, particularly within ±5%. For this purpose, heating is carried out while adjusting the supply electric power to the electrodes and/or the side heater. By such external heating, heat dissipation of the honeycomb shape molded product can efficiently be suppressed, and it is possible to conduct the heating with a uniform temperature distribution, whereby it is possible to readily produce a honeycomb structure which is uniform and free from cracks or fusing loss, even when heating is carried out at a high temperature raising rate.

Conventional silicon carbide honeycomb structures are produced by sintering a silicon carbide powder itself or a mixture of a silicon carbide powder and a sintering assistant, whereby the products will never have the surface roughness and open pore diameter at the cell wall surface, as specified by the present invention.

Now, the heating apparatus of the present invention will be described.

The heating apparatus of the present invention is the one which is useful for heat treatment of an article to be treated by a combination of the electrical heating and the external heating by a side heater, whereby a honeycomb structure of the present invention can be produced when the article to be treated is a honeycomb shape molded product prepared from an electrically conductive material.

The heating apparatus of the present invention comprises a heat treatment chamber (1), and, disposed therein, a pair of electrodes i.e. an upper electrode (3) and a lower electrode (4) to conduct an electric current directly to an article (2) to be treated and a side heater (10) to externally heat the article to be treated from its side surface, wherein the pair of electrodes and the side heater are connected to the respective power supply control apparatus.

The article to be treated is set on the lower electrode, and the lower electrode is moved upwardly by a pneumatic or hydraulic electrode-moving apparatus (16), so that the upper end surface of the article to be treated is pressed against the upper electrode, whereupon the electric current is conducted. The temperature of the article to be treated is measured by a thermometer (6) via a temperature-measuring tube (5), and the controller (7) is actuated by the measured temperature, so that the output for controlling PID is supplied as a command signal to a control circuit, and the output of a thyristor (8) is controlled so that it agrees to the command signal, and the electric current is conducted to the article to be treated via a voltage/current controlling transformer (9).

On the other hand, the side heater is disposed in the vicinity of the side wall portion of the article to be treated, and its temperature is measured by a thermometer (12) via a temperature measuring tube (11). In the same manner as in the above temperature control of the article to be treated, a controller (13) is actuated in accordance with the measured value of the temperature, so that the output for controlling PID is supplied to a control circuit as a command signal, whereupon the output of a thyristor (14) is controlled so that it agrees with the command signal, and the electric current is conducted to the side heater via a voltage/current controlling transformer (15).

Thus, the heat dissipation of the article to be treated can be efficiently suppressed by subjecting the article to be treated to the electric heating and the external heating by the side heater, and it becomes possible to heat the article with a uniform temperature distribution even when heating is carried out at a high temperature raising rate. Further, the respective power supply control apparatus for the pair of electrodes and for the side heater are designed so that heating can be conducted with a uniform temperature distribution in accordance with a change in the heat dissipation corresponding to the shape of the article to be treated and a change in the resistance/temperature characteristics with a temperature rise corresponding to the material constituting the article to be treated, whereby it is possible to precisely control the temperature raising rate or the heat treating time and thereby to conduct the heat treatment constantly under a stabilized condition.

As the material for the upper and lower electrodes, an electrically conductive material such as carbon, silicon carbide, molybdenum silicate or a metal, may, for example, be used. However, it is preferred to make the heat capacity larger than the article to be treated, in order to suppress the heat generation of the electrode portions.

The side heater is preferably disposed parallel with the side wall of the article to be treated. Further, it is preferably disposed within 50 mm, more preferably within 20 mm, from the side wall of the article to be treated. The shape of the side heater is preferably a shape whereby the heat can be uniformly distributed to the side wall of the article to be treated, such as a rod shape or a surface shape. Especially from the viewpoint of the uniform heating and the power consumption by the side heater, it is preferred to employ a surface shape side heater and dispose it to completely surround the side wall of the article to be treated.

As the material for the side heater, a heating element of e.g. carbon, silicon carbide, molybdenum silicate or metal, may, for example, be used. However, a carbon-molded board having a relative density of from 1 to 2 g/cm$^3$ having a small thermal capacity or a small change in the resistance/temperature characteristics, is most suitable, whereby the power consumption can be minimized, and the temperature raising rate can be increased.

Now, the present invention will be described in further detail with reference to Examples and Comparative Examples. However, it should be understood that the present invention is by no means restricted to such specific Examples.

EXAMPLES 1 to 3 and COMPARATIVE EXAMPLES 1 to 3

These Examples represent cases wherein alumina honeycomb structures were prepared by electrical heating and sintering.

b 20parts by weight of water and 8 parts by weight of methyl cellulose as a binder were incorporated to 100 parts by weight of a mixture comprising an alumina powder (mean particle diameter: 30 μm) and a graphite powder (mean particle diameter: 10 to 150 μm) in the proportions as identified in Table 1, and the mixture was mixed for 10 minutes by a Henschel mixer to obtain a kneaded product.

Then, this kneaded product was extrusion-molded into a honeycomb shape having an outer diameter size of 100×100 mm, a cell pitch of 2.0 mm and a cell wall thickness of 0.4 mm by means of a vacuum extrusion molding machine under a molding pressure of 80 kg/cm$^2$, followed by cutting into a length of 100 mm. The obtained honeycomb shape molded product was dried and then heated to remove the binder at 450° C. for 1 hour in a nitrogen atmosphere, followed by electrical heating and sintering.

The electrical heating and sintering were carried out by conducting an electric current of 2000 A at the maximum in the axial direction while pressing both ends of the through-holes of the honeycomb shape molded product under a pressure of 100 g/cm$^2$ with carbon electrodes, raising the temperature to the sintering temperature as identified in Table 1 at a temperature raising rate of 50° C./min in a nitrogen atmosphere, and maintaining the molded product at the sintering temperature for 2 minutes. The obtained sintered product was subjected to oxidation treatment at 900° C. for 3 hours in the atmosphere to burn off the remaining graphite, to obtain a honeycomb structure.

Comparative Example 2 represents a case wherein electrical sintering was carried out while conducting an electric current in a direction vertical to the axis of the honeycomb through-holes, and Comparative Example 3 represents a case wherein the honeycomb shape molded product after removal of the binder was placed in a graphite crucible, and the graphite crucible was heated by a high frequency induction furnace at a temperature raising rate of 10° C./min in an argon atmosphere.

TABLE 1

| | Mixture (wt %) | | Resistance of honeycomb shape molded product (Ω) | Sintering temp. (°C.) |
|---|---|---|---|---|
| | Alumina | Graphite | | |
| Example 1 | 70 | 30 | 2.5 | 1650 |
| Example 2 | 60 | 40 | 0.5 | 1650 |
| Example 3 | 50 | 50 | 0.1 | 1650 |
| Comparative Example 1 | 100 | 0 | >10$^6$ | Impossible to raise the temp. |
| Comparative Example 2 | 60 | 40 | 0.5 | 1650 |
| Comparative Example 3 | 60 | 40 | 0.5 | 1650 |

With respect to the obtained honeycomb structures, the properties which will be mentioned hereinafter, were measured. However, in Comparative Example 2, the surface condition of the porous wall to the direction of electrical conduction varied substantially, and accordingly, evaluation of the pressure loss, the fine particle-collecting performance and the surface roughness was carried out in the parallel and vertical planes to the direction of electrical conduction, and the obtained values were averaged. The results are shown in Table 2.

TABLE 2

| | Characteristics of cell wall of honeycomb structure | | | Performance for collecting fine particles | | Honeycomb structure | |
|---|---|---|---|---|---|---|---|
| | Porosity (%) | Mean pore diameter (μm) | Surface roughness Rz (μm) | Initial pressure loss (mmHg) | Amount of carbon deposited (g/m²) | Strength (MPa) | Resistivity (Ω·cm) |
| Example 1 | 52 | 16 | 38 | 65 | 30 | 2.8 | >10⁶ |
| Example 2 | 63 | 18 | 45 | 59 | 39 | 2.1 | >10⁶ |
| Example 3 | 74 | 22 | 58 | 48 | 57 | 1.8 | >10⁶ |
| Comparative Example 1 | — | — | — | — | — | — | — |
| Comparative Example 2 | 59 | 16 | 25 | 62 | 19 | 0.7 | >10⁶ |
| Comparative Example 3 | 62 | 18 | 8 | 73 | 17 | 1.4 | >10⁶ |

As is evident from Table 2, an alumina DPF excellent in the performance for collecting combustible fine particles can be obtained by adjusting the surface roughness (Rz) of the cell wall of the honeycomb structure to a level of at least 30 μm. EXAMPLES 4 to 12 and COMPARATIVE EXAMPLES 4 to 8

These Examples represent cases wherein a silicon carbide honeycomb structure was prepared by electrical heating and sintering.

A honeycomb structure was prepared in the same manner as in Example 1 except that using a mixture comprising a silicon carbide powder (mean particle diameter: 30 μm), a silicon nitride powder (mean particle diameter: 25 μm) and carbon black (mean particle diameter: 80 nm) in the proportions as identified in Table 3, the temperature was raised to the sintering temperature as identified in Table 3 at a rate of 50° C./min. Like Comparative Example 2, Comparative Example 7 represents a case wherein electrical sintering was carried out by conducting an electric current in a direction vertical to the axis of the honeycomb through-holes, and like Comparative Example 3, Comparative Example 8 represents a case wherein sintering was carried out by a high frequency induction heating furnace. Further, the properties in Comparative Example 7 were evaluated in the same manner as in Comparative Example 2. The results are shown in Table 4.

TABLE 3

| | Mixture (wt %) | | | Si/C molar ratio | Resistance of honey-comb shape molded product (Ω) | Sintering temp. (°C.) |
|---|---|---|---|---|---|---|
| | Silicon carbide | Silicon nitride | Carbon black | | | |
| Example 4 | 20 | 63.6 | 16.4 | 1.0 | 0.5 | 1800 |
| Example 5 | 40 | 47.7 | 12.3 | 1.0 | 0.7 | 2000 |
| Example 6 | 60 | 31.8 | 8.2 | 1.0 | 0.7 | 2200 |
| Example 7 | 80 | 15.9 | 4.1 | 1.0 | 95 | 2300 |
| Example 8 | 40 | 39.6 | 20.4 | 0.5 | 0.2 | 2000 |
| Example 9 | 40 | 51.2 | 8.8 | 1.5 | 0.7 | 1600 |
| Example 10 | 60 | 32.9 | 7.1 | 1.2 | 1.0 | 1800 |
| Example 11 | 40 | 45.4 | 14.6 | 0.8 | 0.7 | 2300 |
| Example 12 | 60 | 31.8 | 8.2 | 1.0 | 0.7 | 2400 |
| Comparative Example 4 | 15 | 67.6 | 17.4 | 1.0 | 0.5 | 1800 |
| Comparative Example 5 | 85 | 11.9 | 3.1 | 1.0 | <10³ | Impossible to raise the temp. |
| Comparative Example 6 | 40 | 47.7 | 12.3 | 1.0 | 0.7 | 1500 |
| Comparative Example 7 | 40 | 47.7 | 12.3 | 1.0 | 0.6 | 2000 |
| Comparative Example 8 | 40 | 47.7 | 12.3 | 1.0 | 0.6 | 2000 |

TABLE 4

| | Characteristics of cell wall of honeycomb structure | | | Performance for collecting fine particles | | Honeycomb structure | |
|---|---|---|---|---|---|---|---|
| | Porosity (%) | Mean pore diameter (μm) | Surface roughness Rz (μm) | Initial pressure loss (mmHg) | Amount of carbon deposited (g/m²) | Strength (MPa) | Resistivity (Ω·cm) |
| Example 4 | 54 | 16 | 38 | 21 | 33 | 12.0 | 0.6 |
| Example 5 | 50 | 18 | 85 | 12 | 43 | 10.5 | 0.4 |
| Example 6 | 46 | 22 | 108 | 10 | 67 | 9.8 | 0.8 |
| Example 7 | 43 | 24 | 179 | 7 | 89 | 6.5 | 1.1 |
| Example 8 | 56 | 7 | 54 | 37 | 35 | 13.4 | 0.4 |
| Example 9 | 49 | 16 | 33 | 18 | 36 | 11.2 | 1.2 |
| Example 10 | 48 | 19 | 53 | 14 | 35 | 10.1 | 0.7 |
| Example 11 | 53 | 24 | 238 | 9 | 93 | 7.9 | 1.1 |
| Example 12 | 47 | 38 | 348 | 5 | 90 | 0.8 | 1.3 |
| Comparative Example 4 | 58 | 17 | 24 | 11 | 40 | 1.4 | 0.1 |
| Comparative Example 5 | — | — | — | — | — | — | — |
| Comparative Example 6 | 48 | 3 | 17 | 66 | 6 | 9.4 | 7.2 |
| Comparative Example 7 | 52 | 9 | 19 | 40 | 9 | 1.9 | 1.9 |
| Comparative Example 8 | 54 | 11 | 10 | 53 | 3 | 8.3 | 8.3 |

As is evident from Tables 3 and 4, a silicon carbide DPF excellent in the performance for collecting combustible fine particles, can be obtained by adjusting the surface roughness (Rz) of the cell wall of the honeycomb structure to a level of at least 30 μm. EXAMPLES 13 to 15

These Examples represent cases wherein a silicon carbide honeycomb structure was prepared by conducting electrical heating and sintering in the same manner as in Examples 4 to 12. However, these Examples are different from Examples 4 to 12 in that a mixture having a part of the silicon nitride powder substituted by a silicon oxide powder, was used.

TABLE 5

| | Mixture (wt %) | | | | Si/C molar ratio | Resistance of honeycomb shape molded product (Ω) |
|---|---|---|---|---|---|---|
| | Silicon carbide | Silicon nitride | Silicon oxide | Carbon black | | |
| Example 5 | 40 | 47.7 | 0 | 12.3 | 1.0 | 0.7 |
| Example 13 | 40 | 45.5 | 2.3 | 12.2 | 1.0 | 0.7 |
| Example 14 | 40 | 43.6 | 4.3 | 12.1 | 1.0 | 0.7 |
| Example 15 | 40 | 37.1 | 11.1 | 11.8 | 1.0 | 0.7 |

TABLE 6

| | Characteristics of cell wall of honeycomb structure | | | | Performance collecting fine particles | | Honeycomb structure | |
|---|---|---|---|---|---|---|---|---|
| | Porosity (%) | Mean pore diameter (μm) | Surface roughness Rz (μm) | Open pore diameter (μm) | Initial pressure loss (mmHg) | Amount of carbon deposited (g/m²) | Strength (MPa) | Resistivity (Ω·cm) |
| Example 5 | 50 | 18 | 85 | 17 | 12 | 43 | 10.5 | 0.4 |
| Example 13 | 50 | 19 | 88 | 23 | 10 | 69 | 10.1 | 0.4 |
| Example 14 | 51 | 20 | 94 | 25 | 8 | 85 | 9.7 | 0.5 |
| Example 15 | 53 | 25 | 108 | 29 | 6 | 107 | 9.4 | 0.7 |

Honeycomb structures were prepared and evaluated in the same manner as in Example 5 except that as shown in Table 5, mixtures having a part of the silicon nitride powder substituted variously by a silicon oxide powder (mean particle diameter: 0.5 μm), were used.

It is evident from Tables 5 and 6 that by using a mixture having a part of the silicon nitride powder substituted by a suitable amount of a silicon oxide powder, it is possible to bring the open pore diameter at the cell wall surface to a level of at least 20 μm, without lowering the surface roughness of the cell wall. As a result, it is possible to produce a silicon carbide DPF which is excellent in the performance for collecting combustible fine particles.

EXAMPLES 16 to 19

These Examples represent cases wherein by means of a heating apparatus as shown in FIG. 1, honeycomb shape molded products prepared in Examples 5 and 14 were subjected to external heating by a side heater from the side surface, at the same time as electrical heating and sintering, to obtain silicon carbide honeycomb structures.

Honeycomb shape molded products were prepared, dried and heated to remove the binder in the same manner as in Examples 5 and 14. Each molded product was set on a pair of carbon electrodes and subjected to electrical heating and sintering under the conditions as identified in Table 7 in a nitrogen atmosphere, while conducting external heating by a side heater from its side surface, to obtain a honeycomb structure. Such an operation was repeated to prepare 10 honeycomb structures for each Example, and the crack-forming rate (%) and the internal fusing loss-forming rate (%) were measured.

Further, to evaluate the uniformity of the obtained honeycomb structure, a sample obtained from the interior within a range of from 50 to 100 mm from the honeycomb end faces and at least 30 mm from the side wall, was designated as an interior evaluation sample, and a sample obtained from a portion other than the above interior was designated as an exterior evaluation sample, and various properties were evaluated. The results are shown in Table 7.

wherein no formation of cracks was observed even when heating was conducted at a high temperature raising rate.

REFERENCE EXAMPLE

In Example 5, the temperature raising rate of the honeycomb shape molded product was increased from 50° C./min to 80° C./min, whereby the crack-forming rate was 10%, but the characteristics of the honeycomb structure free from formation of cracks, were equal to Example 5.

EXAMPLES 20 to 30 and COMPARATIVE EXAMPLES 9 to 16

These Examples represent cases wherein silicon carbide honeycomb structures were prepared by using a mixture having a part of the silicon nitride powder substituted by a silicon oxide powder in the same manner as in Examples 13 to 15. However, these Examples are different from Examples 13 to 15 in that sintering was carried out only by the external heating without conducting electrical heating and sintering.

Using a mixture comprising a silicon carbide powder (mean particle diameter: 10 µm), a silicon nitride powder (mean particle diameter: 45 µm), a silicon oxide powder having a mean particle diameter as identified in Table 8 and a graphite powder (mean particle diameter: 10 µm) in the proportions as identified in Table 8, a honeycomb shape

TABLE 7

| Examples | | 5 | 16 | 17 | 14 | 18 | 19 |
|---|---|---|---|---|---|---|---|
| Type of honeycomb shape molded product | | Same as in Example 5 | | | Same as in Example 14 | | |
| External heating by side heater | | No | Yes | Yes | No | Yes | Yes |
| Temperature-raising rate (°C./min) | | 50 | 100 | 200 | 50 | 100 | 200 |
| Sintering temp (°C.) | | 2000 | 2000 | 2000 | 2000 | 2000 | 2000 |
| Retention time (min) | | 1 | 1 | 1 | 1 | 1 | 1 |
| Maximum temperature difference (%) | | +15 | +10 | −5 | +15 | +10 | −5 |
| Characterisitics of honeycomb structure | | | | | | | |
| Crack-forming rate (%) | | 0 | 0 | 0 | 0 | 0 | 0 |
| Interior fusing loss-forming rate (%) | | 0 | 0 | 0 | 0 | 0 | 0 |
| Composition | Interior | SiC | SiC | SiC | SiC | SiC | SiC |
| | Exterior | SiC>>C | SiC | SiC | SiC>>C | SiC | SiC |
| Resistivity | Interior | 0.4 | 0.2 | 0.2 | 0.4 | 0.3 | 0.2 |
| (Ω · cm) | Exterior | 0.6 | 0.2 | 0.3 | 0.5 | 0.3 | 0.3 |
| Strength | Interior | 9.0 | 10.0 | 9.5 | 7.7 | 9.8 | 9.7 |
| (MPa) | Exterior | 12.0 | 10.5 | 10.0 | 11.7 | 9.7 | 9.6 |
| Surface roughness | Interior | 95 | 97 | 95 | 95 | 95 | 93 |
| of cell wall (µm) | Exterior | 75 | 95 | 90 | 87 | 94 | 94 |
| Open pore diameter | Interior | 19 | 19 | 20 | 28 | 25 | 25 |
| at cell wall surface | Exterior | 15 | 19 | 19 | 23 | 25 | 24 |
| Mean pore diameter | Interior | 19 | 20 | 19 | 20 | 20 | 20 |
| (µm) | Exterior | 17 | 19 | 19 | 19 | 20 | 19 |

Note:
Maximum temperature differnce (%) = (Outer surface temperature of honeycomb shape molded product - side heater temperature) × 100/outer surface temperature of honeycomb shape molded product It is evident from Table 7 that, by the combined use of electrical heating and external heating (Examples 16 to 19), the resulting honeycomb structure will be uniform at both interior and exterior, as compared with a case wherein no such combined use is adopted (Examples 5 and 14). Besides, it was possible to prepare a uniform honeycomb structure molded product was prepared, dried, heated to remove the binder, placed in a graphite crucible and sintered in a nitrogen atmosphere at a rate of 10° C./min to the temperature as identified in Table 8 by a high frequency induction heating furnace to obtain a silicon carbide honeycomb structure. The results are shown in Table 9.

TABLE 8

| | Mixture (wt %) | | | | Mean particle diameter of silicon oxide (μm) | Silicon oxide per 100 parts by weight of silicon nitride (parts by weight) | Si/C molar ratio | Sintering temp. (°C.) |
|---|---|---|---|---|---|---|---|---|
| | Silicon carbide | Silicon nitride | Silicon oxide | Graphite | | | | |
| Example 20 | 20 | 53.4 | 10.7 | 15.9 | 0.3 | 20.0 | 1.0 | 1800 |
| Example 21 | 40 | 40.1 | 8.0 | 11.9 | 0.5 | 20.0 | 1.0 | 2000 |
| Example 22 | 80 | 13.3 | 2.7 | 4.0 | 1.0 | 20.0 | 1.0 | 2400 |
| Example 23 | 40 | 40.1 | 8.0 | 11.9 | 0.03 | 20.0 | 1.0 | 2000 |
| Example 24 | 40 | 45.5 | 2.3 | 12.2 | 0.3 | 5.0 | 1.0 | 2200 |
| Example 25 | 40 | 37.1 | 11.1 | 11.8 | 0.5 | 30.0 | 1.0 | 2000 |
| Example 26 | 40 | 33.4 | 6.7 | 19.9 | 0.3 | 20.0 | 0.5 | 2000 |
| Example 27 | 40 | 42.9 | 8.6 | 8.5 | 0.3 | 20.0 | 1.5 | 1600 |
| Example 28 | 40 | 40.1 | 8.0 | 11.9 | 0.3 | 20.0 | 1.0 | 2200 |
| example 29 | 40 | 40.1 | 8.0 | 11.9 | 0.3 | 20.0 | 1.0 | 2400 |
| Example 30 | 40 | 40.1 | 8.0 | 11.9 | 0.3 | 20.0 | 1.0 | 2500 |
| Comparative Example 9 | 85 | 10.0 | 2.0 | 3.0 | 1.0 | 20.0 | 1.0 | 2000 |
| Comparative Example 10 | 40 | 40.1 | 8.0 | 11.9 | 2.0 | 20.0 | 1.0 | 2200 |
| Comparative Example 11 | 40 | 46.4 | 1.4 | 12.2 | 0.3 | 3.0 | 1.0 | 2000 |
| Comparative Example 12 | 40 | 34.5 | 13.8 | 11.7 | 0.5 | 40.0 | 1.0 | 1800 |
| Comparative Example 13 | 40 | 30.9 | 6.2 | 22.9 | 0.03 | 20.0 | 0.4 | 2200 |
| Comparative Example 14 | 40 | 43.7 | 8.7 | 7.6 | 0.3 | 20.0 | 1.7 | 2000 |
| Comparative Example 15 | 40 | 40.1 | 8.0 | 11.9 | 0.03 | 20.0 | 1.0 | 1500 |
| Comparative Example 16 | 40 | 47.7 | 0 | 12.3 | — | — | 1.0 | 2000 |

TABLE 9

| | Characteristics of cell wall of honeycomb structure | | | | Performance for collecting fine particles | | |
|---|---|---|---|---|---|---|---|
| | | Open pore diameter | | Surface roughness | | | |
| | Porosity of cell wall (%) | at cell wall surface (μm) | Mean pore diameter of cell wall (μm) | Rz of cell wall surface (μm) | Initial pressure loss (mmHg) | Amount of carbon deposited (g/m²) | Honeycomb structure (MPa) |
| Example 20 | 58.2 | 36.5 | 20.5 | 54.4 | 17.2 | 34.4 | 3.9 |
| Example 21 | 52.1 | 28.3 | 13.8 | 39.1 | 21.4 | 31.5 | 10.1 |
| Example 22 | 40.0 | 20.4 | 8.1 | 30.8 | 41.1 | 25.8 | 16.1 |
| Example 23 | 52.1 | 28.1 | 13.8 | 45.1 | 21.4 | 31.2 | 10.4 |
| Example 24 | 50.3 | 21.3 | 16.2 | 31.9 | 19.3 | 29.5 | 11.3 |
| Example 25 | 53.2 | 28.7 | 15.4 | 75.4 | 21.2 | 33.3 | 8.3 |
| Example 26 | 53.3 | 22.2 | 8.7 | 31.6 | 42.3 | 27.0 | 17.4 |
| Example 27 | 51.5 | 24.8 | 12.2 | 30.0 | 31.1 | 28.2 | 13.3 |
| Example 28 | 52.1 | 28.6 | 18.9 | 63.6 | 19.0 | 32.3 | 9.0 |
| Example 29 | 52.3 | 32.2 | 16.2 | 60.0 | 17.2 | 33.7 | 8.1 |
| Example 30 | 53.5 | 43.3 | 34.1 | 108.2 | 6.4 | 44.5 | 2.0 |
| Comparative Example 9 | 38.2 | 15.2 | 2.1 | 20.4 | 65.0 | 11.5 | 18.9 |
| Comparative Example 10 | 52.1 | 14.1 | 15.5 | 21.6 | 39.0 | 12.1 | 8.3 |
| Comparative Example 11 | 50.0 | 11.5 | 13.2 | 12.6 | 31.7 | 6.2 | 15.8 |
| Comparative Example 12 | — | — | — | — | — | — | — |
| Comparative Example 13 | 54.2 | 2.6 | 6.1 | 15.6 | 97.1 | 3.7 | 1.3 |
| Comparative Example 14 | — | — | — | — | — | — | — |
| Comparative | 52.1 | 1.6 | 3.5 | 14.9 | 150.7 | 3.3 | 4.9 |

It is evident from Tables 8 and 9 that by using a mixture having a part of the silicon nitride powder by a proper amount of a silicon oxide powder, it is possible to prepare a silicon carbide DPF excellent in the performance for collecting combustible fine particles, wherein the open pore diameter at the cell wall surface is at least 20 μm, by external heating and sintering even without conducting electrical heating and sintering.

The various properties disclosed in this specification were measured by the following methods.

(1) Porosity of the cell wall: Measured in accordance with an Archimedes method.

(2) Open pore diameter at the cell wall surface: The cell wall surface was observed by a scanning electron microscope, and the pore portions formed by silicon carbide particles and their spaces, were treated for two diameters by an image analysis, whereby the dimensional analysis was carried out on the assumption that the pores were circular, and a mean value of the respective diameters was taken as the open pore diameter at the cell wall surface.

(3) Mean pore diameter in the cell wall: The pore diameter distribution was measured by a mercury injection method, and on the assumption that the pores were cylindrical, the total pore volume was divided by the specific surface area of pores to obtain a mean diameter, which was taken as a mean pore diameter in the cell wall.

(4) Surface roughness (Rz) of the cell wall: In accordance with JIS B 0601, an optional honeycomb through-hole was selected, and the surface roughness of this through-hole was measured over a length of 40 mm in the axial direction, and it was converted to a value of a standard length of 8 mm.

(5) Performance for collecting fine particles: A portion of the cell wall (outer diameter size 20×20 mm×thickness 0.4 mm) was cut out from the honeycomb structure and air of 2 l/min was passed therethrough, whereby the initial pressure loss was measured. A carbon slurry having a solid content concentration of 5% was coated on the cell wall and dried, and then air of 2 l/min was passed therethrough, whereby the amount of deposition of carbon was measured until the pressure loss reached 200 mmHg.

(6) Strength of the honeycomb structure: A honeycomb structure was cut into a specimen having an outer diameter size 10×10 mm×length 10 mm, and the compression strength in the extrusion direction (the axial direction of the honeycomb through-holes) was measured at a cross head speed of 0.5 mm/min.

(7) Resistivity of a honeycomb structure: A honeycomb structure was cut into a specimen having an outer diameter size 10×10 mm×length 50 mm, and silver electrodes were formed, whereupon the resistivity was measured by a four terminal method.

(8) Composition of a honeycomb structure: X-ray diffraction was carried out, whereby a qualitative analysis of the composition was made from the peak strength.

(9) Resistance of a honeycomb shape molded product: A silver paste was baked to both ends of extrusion direction, whereupon a room temperature voltage at a constant current of 0.1 A was measured by a digital multimeter.

The effects obtainable by the present invention may be summarized as follows.

(i) The honeycomb structure of the present invention has the surface roughness of the cell wall roughened to a level of at least 30 μm, whereby the area for collecting combustible fine particles is large.

(ii) The honeycomb structure of the present invention is the one wherein the surface roughness of the cell wall is at least 30 μm, and the open pore diameter at the cell wall surface is at least 20 μm, whereby the effects for collecting combustible fine particles are excellent, and the time until clogging takes place, can be prolonged.

(iii) DPF of the present invention is constituted by the honeycomb structure excellent in the effects for collecting combustible fine particles, whereby it is unnecessary to conduct regeneration frequently, and downsizing is possible.

(iv) DPF of the present invention is constituted by silicon carbide ceramics, whereby cracking or fusing loss during the regeneration or thermal stress cracking due to heat cycles scarcely occurs.

(v) According to the process for producing a honeycomb structure of the present invention, a honeycomb structure excellent in the effects for collecting combustible fine particles, can be produced at high productivity.

(vi) By sintering the honeycomb shape molded product by a combination of electrical heating and external heating by a side heater, a much uniform honeycomb structure can be prepared even by heating at a high temperature raising rate.

(vii) According to the heating apparatus of the present invention, it is possible to provide an apparatus whereby setting of heating conditions is easy and an article to be treated can be uniformly heat-treated.

What is claimed is:

1. A honeycomb structure having an electrically sintered, porous cell wall, wherein the surface roughness of the cell wall is at least 30 μm and wherein the structure comprises a honeycomb shape molded product which before sintering has a resistance of $10^{-1}$ to $10^2$ Ω at room temperature.

2. The honeycomb structure according to claim 1, wherein the open pore diameter at the cell wall surface is at least 20 μm.

3. The honeycomb structure according to claim 2, wherein the mean diameter of pores in the cell wall is from 10 to 40 μm, and the porosity of the cell wall is at least 40%.

4. The honeycomb structure according to claim 1, wherein the honeycomb structure is made of alumina, cordierite, mullite, silicon nitride or aluminum nitride.

5. The honeycomb structure according to claim 1, wherein the honeycomb structure comprises silicon carbide.

6. A honeycomb structure as claimed in claim 1, wherein the cell wall is composed of 20 to 80 wt% of a silicon carbide powder, the remainder being substantially a silicon nitride powder and a carbonaceous material, wherein the molar ratio of the silicon content in the silicon nitride powder to the carbon content in the carbonaceous material is from 0.5 to 1.5 and said cell wall is calcined at a temperature of at least 1,600° C.

7. A honeycomb structure as claimed in claim 1, wherein said cell wall is composed of 20 to 80 wt% of a silicon carbide powder, the remainder being substantially a silicon nitride powder, a silicon oxide powder and a carbonaceous material, wherein the silicon oxide powder has a mean particle diameter of at most 1 μm and the proportion thereof is 5 to 30 parts by weight per 100 parts by weight of the silicon nitride powder, and the proportion of the carbonaceous material is such that the molar ratio of the total silicon content in the silicon powder and the silicon oxide powder to the carbon content in the carbonaceous material is from 0.5 to 1.5, and such is calcined at a temperature at least 1,600° C.

8. A diesel particulate filter which comprises a honeycomb structure having an electrically sintered, porous cell wall wherein the surface roughness of the cell wall is at least 30 μm and the honeycomb structure is made of silicone carbide wherein the honeycomb structure comprises a honeycomb shape molded product which before sintering has a resistance of $10^{-1}$ to $10^2$ Ω at room temperature.

9. The honeycomb structure as claimed in claim 8, wherein said filter is composed of 20 to 80 wt% of a silicon carbide powder, the remainder being substantially a silicon nitride powder and a carbonaceous material, wherein the molar ratio of the silicon content and the silicon nitride powder to the carbon content in the carbonaceous material is from 0.5 to 1.5, and such as calcined at a temperature of at 1,600° C.

10. A filter as claimed in claim 8, wherein said cell wall is composed to 20 to 80% of a silicon carbide powder, the remainder substantially a silicon nitride powder, a silicon oxide powder and a carbonaceous material, wherein the silicon oxide powder has a mean particle diameter of at most 1 μm and the proportion thereof is 5 to 30 parts by weight per 100 parts by weight of the silicon nitride powder, and the proportion of the carbonaceous material is such that the molar ratio of the total silicon content in the silicon nitride powder and the silicon oxide powder to the carbon content in the carbonaceous material is from 0.5 to 1.5 and such is calcined at a temperature of at least 1600° C.

\* \* \* \* \*